US008271009B2

(12) United States Patent
Bohn et al.

(10) Patent No.: US 8,271,009 B2
(45) Date of Patent: Sep. 18, 2012

(54) METHOD FOR INTERRUPTING VOICE TRANSMISSIONS WITHIN A MULTI SITE COMMUNICATION SYSTEM

(75) Inventors: Thomas B. Bohn, McHenry, IL (US); Dipendra M. Chowdhary, Hoffman Estates, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 393 days.

(21) Appl. No.: 12/621,170

(22) Filed: Nov. 18, 2009

(65) Prior Publication Data
US 2011/0117835 A1 May 19, 2011

(51) Int. Cl.
*H04Q 7/20* (2006.01)
(52) U.S. Cl. ............ 455/509; 455/518; 455/519; 455/7; 455/11.1; 455/515; 370/259; 370/260; 370/261; 370/315; 370/327
(58) Field of Classification Search .......... 455/509, 455/511, 512, 515, 516–519, 500, 7, 11.1, 455/550.1, 422.1, 403, 445, 414.1–414.4, 455/450, 426.1, 426.2; 370/260, 261, 259, 370/315, 327, 328, 329
See application file for complete search history.

(56) References Cited

U.S. PATENT DOCUMENTS

| 3,955,140 A * | 5/1976 | Stephens et al. ............ 455/11.1 |
| 2007/0206533 A1 | 9/2007 | Wiatrowski et al. |
| 2008/0175158 A1 | 7/2008 | Wiatrowski et al. |
| 2008/0291853 A1 | 11/2008 | Wiatrowski et al. |

FOREIGN PATENT DOCUMENTS

| JP | 11103264 A * | 4/1999 |
| KR | 10-0426252 B1 | 4/2004 |

OTHER PUBLICATIONS

U.S. Appl. No. 12/136,177, filed Jun. 10, 2008—Specification and Drawings as filed—36 pages.
U.S. Appl. No. 12/253,411, filed Oct. 17, 2008—Specification and Drawings as filed—31 pages.
International Search Report for International Patent Application No. PCT/US10/52132 mailed on Jun. 27, 2011.

* cited by examiner

*Primary Examiner* — Keith Ferguson
(74) *Attorney, Agent, or Firm* — Randi L. Karpinia; Anthony P. Curtis; Daniel R. Bestor (57) ABSTRACT

A method for interrupting voice transmissions within a multi site communication system includes operating a repeater to engage in an interruptible voice communication; to identify an open burst location based on a repeat delay when the interruptible voice communication is sourced directly via a wireless network, and to identify the open burst location as irrelevant when the interruptible voice communication is indirectly sourced via a wireless network; and repeat the interruptible voice communication including the open burst location.

10 Claims, 7 Drawing Sheets

| BIT NUMBER | 10 | 9 | 8 | 7 | 6 | 5 | 4 | 3 | 2 | 1 | 0 |
|---|---|---|---|---|---|---|---|---|---|---|---|
| MESSAGE FIELD | CRC | | | DELAY FIELD | | | | | OPCODE | | |

305 — CRC
310 — DELAY FIELD
315 — OPCODE
300

FIG. 4

| DELAY FIELD | | | REPEATER DELAY | INBOUND BACKWARD CHANNEL ALIGNMENT WITH OUTBOUND BURST |
|---|---|---|---|---|
| 0 | 0 | 0 | IRRELEVANT | IRRELEVANT, SEND AT ANY TIME |
| 0 | 0 | 1 | 60ms | SUPERFRAME 3 BURST E |
| 0 | 1 | 0 | 120ms | SUPERFRAME 3 BURST D |
| 0 | 1 | 1 | 180ms | SUPERFRAME 3 BURST C |
| 1 | 0 | 0 | 240ms | SUPERFRAME 3 BURST B |

405 — DELAY FIELD
410 — REPEATER DELAY
415 — INBOUND BACKWARD CHANNEL ALIGNMENT WITH OUTBOUND BURST
400

METHOD FOR INTERRUPTING VOICE TRANSMISSIONS WITHIN A MULTI SITE COMMUNICATION SYSTEM

FIELD OF THE DISCLOSURE

The present disclosure relates generally to wireless communications and more particularly to voice transmissions within a multi site communication system.

BACKGROUND

Multi site communication systems provide wide-area coverage for users of the system. These systems comprise a number of sites, with each site corresponding to a different geographic coverage area and each site having located therein an infrastructure device (which will hereinafter be referred to as a repeater or Base Repeater, BR) serving the coverage area by managing one or more channels in the coverage area. Accordingly, for purposes of the teachings herein, a site is characterized by a repeater that serves a particular coverage area, a channel for wireless communication device transmissions, and a system identification that identifies transmissions from the repeater on the channel at the site. Some or all of the infrastructure devices in a multi site communication system may be networked or connected together via a backend network to provide the wide-area coverage via one or more logical wide-area channels, and in many instances two or more of the coverage areas have some degree of overlap. A backend network may comprise a T-1 link, point to point microwave, private internet, or public internet, for example.

Multi site communication systems may be designed as trunked systems or conventional systems. In trunked systems, a limited number of communication channels are shared among a much larger number of users to facilitate efficient use of the system's communication resources. Thus, to afford each user a reasonable opportunity to use the system's resources, one or more control channels are utilized by the infrastructure to allocate the shared resources between the many users in the system. In general, when a wireless communication device (which will hereinafter be referred to as a radio) wants to communicate on the trunked system, it sends a request on the control channel to communicate with another radio or group of radios. In turn, the requesting radio (and the radios to which it desires to communicate) receives back on the control channel the allocation of a traffic channel to use for their communications. Upon the conclusion of the communications, the allocated channel is released for use by other radios in the system.

In conventional systems, a number of communication channels are also shared amongst a number of users (although the number of users per channel is typically much smaller than in trunked systems). However, there is no control mechanism provisioned in the infrastructure to allocate the resources among the users in the system. Thus, in contrast to a trunked system, each channel in a conventional system is dedicated to one or more groups of users enabling the users to control access to the channels through their radios by manually selecting a channel or selecting a talkgroup that is assigned a particular channel in order to start a communication session and transmit and receive media during the session.

When a communication device such as a subscriber unit or a repeater is transmitting communications, there may be instances when interrupting the communication device may be important and/or beneficial. For example, a first police officer needing back up may need to interrupt a second police officer that is engaged in a call. In such an instance, it would be important to have a mechanism to interrupt the second police officer to notify the second officer that the first police officer requires assistance.

Accordingly, there is a need for a method for interrupting voice transmissions within a multi site communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for interrupting voice transmissions within a multi site communication system includes operating a repeater to engage in an interruptible voice communication; to identify an open burst location based on a repeat delay when the interruptible voice communication is received from a source directly via a wireless network, and to identify the open burst location as irrelevant when the interruptible voice communication is received indirectly from a source via a backend network; and repeat the interruptible voice communication including the open burst location.

Figure 1:
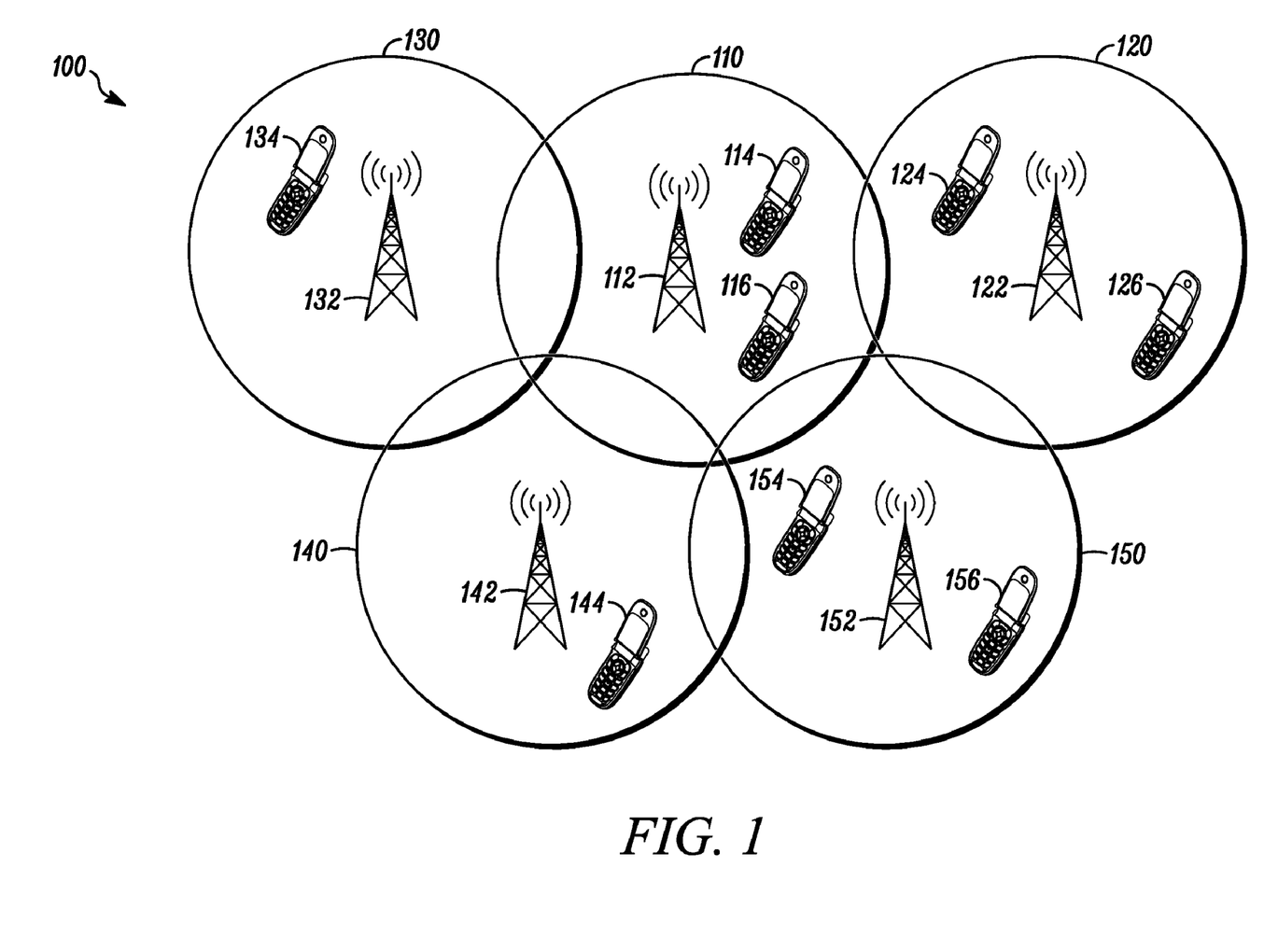
FIG. 1 is a block diagram of a wireless communication network in which may be implemented some illustrative embodiments.

Referring now to the drawings and in particular to FIG. 1, a wireless communication network 100 is depicted in which may be implemented some illustrative embodiments. Communication network 100 comprises sites 110, 120, 130, 140, and 150 each having a repeater located in a geographic coverage area as indicated by the circles drawn in the figure, wherein all of the repeaters in this illustrative embodiment are networked together via a backend network such as an Internet Protocol (IP) backbone (not shown), and there is no central controller for the repeaters as is common in conventional systems. More particularly, site 110 includes a repeater 112 that manages at least one channel at site 110. Site 120 includes a repeater 122 that manages at least one channel at site 120. Site 130 includes a repeater 132 that manages at least one channel at site 130. Site 140 includes a repeater 142 that manages at least one channel at site 140. Site 150 includes a repeater 152 that manages at least one channel at site 150. Moreover, each site is associated with a different site identification that uniquely identifies transmissions from the repeater at the site. An example of site identification is a color code.

Further illustrated are radios 114 and 116 operating in site 110, radios 124 and 126 operating in site 120, radio 134 operating in site 130, radio 144 operating in site 140, and radios 154 and 156 operating in site 150. Since the radios are mobile, the radios and the repeaters communicate over an air interface using an air interface protocol that can be either standard or proprietary. One such standard is a Digital Mobile Radio (DMR) air interface standard, which includes specification of a protocol used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). The ETSI DMR standard specifies a two-slot Time Division Multiple Access (TDMA) structure that transmitting and receiving devices can utilize to send voice and/or data signals. The voice and data signals are transmitted in the TDMA slots in accordance with a general burst format specified in the standard. However, both proprietary and standard air interface messaging could be used in network 100.

In addition, the radios and repeaters can communicate information over a channel using any modulation scheme including, but not limited to, TDMA (having any slotting ratio), Frequency Division Multiple Access (FDMA), Code Division Multiple Access (CDMA), Orthogonal Frequency-Division Multiple Access (OFDMA), to name a few. As such, those skilled in the art will recognize and appreciate that the specifics of this example are merely illustrative of some embodiments and that the teachings set forth herein are applicable in a variety of alternative settings. Thus, since the teachings described do not depend on the environment, they can be applied to any type of wireless communication network or system having any number sites, repeaters and radios, wherein the radios communicate via a multi site channel and the repeaters use an arbitration process to control access to the multi site channel.

Referring again to FIG. 1, each repeater and radio is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2, FIG. 5 and FIG. 6.

As referred to herein, a radio includes, but is not limited to, devices commonly referred to as wireless communication devices, access terminals, mobile radios, mobile stations, subscriber units, user equipment, mobile devices, or any other device capable of operating in a wireless environment, and are referred to hereinafter simply as radios. Examples of radios include, but are not limited to, two-way radios, mobile phones, cellular phones, Personal Digital Assistants (PDAs), laptops and two-way pagers.

As used herein, a repeater is a device that is a part of a fixed network infrastructure and can receive information (either control or media, e.g., data, voice (audio), video, etc.) in a signal from a radio over the air or over a backend network such as the public internet and transmit information in signals to one or more radios via a communication link. For radios at the same site as the transmitter, the repeater sends the received transmission out over the air. For radios at other sites the repeater sends the received transmission over the backend network to the other repeaters which send it out over the air. It will be appreciated that a repeater can also perform floor control arbitration, which is an arbitration process that is used for allocating the floor to one user apparatus at a time per channel during a session. A channel in a TDMA system may comprise an RF carrier frequency and a timeslot, for example. A repeater includes, but is not limited to, equipment commonly referred to as infrastructure devices, base radios, base stations, base transceiver stations, access points, routers or any other type of infrastructure equipment interfacing a wireless communication device in a wireless environment, and is referred to hereinafter simply as a repeater.

As mentioned earlier, the devices in network 100 communicate using communication links (also referred to herein as channels). The channels are the physical communication resources over which information is sent between the devices within network 100 and typically comprise wireless links. If the channels comprise wireless links, the corresponding physical resource is an allocation of radio spectrum that is partitioned into radio frequency (RF) carriers that are modulated by a media or control stream. The repeater at each site manages the communication resources (i.e., the physical channel) in its geographic area by determining which radio transmissions it will repeat at any given time.

As it relates to the embodiments described herein, the terms communication and transmission refer to messages emanating from one device, which may include media or control information. More particularly, a transmission is defined as one or more related discreet units of media information or one or more related discreet units of control information sent from a single device. The particular type of discreet unit of information sent in the system depends on the protocols being used. For example, in TDMA systems, the burst is the smallest standalone unit of information sent in the system, and a transmission can include one or more related bursts. Accordingly, a voice transmission can include several bursts containing voice that a user spoke into a radio microphone in between the time the user pressed a push-to-talk (PTT) button on the radio and when the user released the PTT button. In other system implementations, a transmission may comprise, for instance, one or more packets of control or media information, one or more datagrams of control or media information, one or more blocks of control or media information, etc.

Moreover, a media (or content) transmission is defined as a transmission that contains media information that is intended for viewing or listening by a user in the system and includes, for instance, audio (voice), data, video, etc. Whereas, a control transmission is defined as a transmission that contains non-media information including, but not limited to, signaling to establish or manage connections in the system, call setup information, location information, etc. The term call is defined as one or more related media transmissions between two or more devices during a communication session. A communication session, or simply session, is defined as a sequence of related transmissions between two or more devices permitted to participate in the session. The session begins with one or more control transmissions followed by a call and ends as a result of some action or inaction by one of the session participants or by the repeater, which is repeating the session transmissions; and the time gap between each transmission in the session is less than the time required to set up the communication resources for the session.

In addition, since the repeaters are networked together, a physical channel managed by each repeater is coupled together to form a "wide-area channel" (also referred to herein as a "multi site channel") on which radios at different sites can hear the same transmissions.

In single site communication networks, transmitter interrupt can be accomplished in a method such as described in U.S. patent application Ser. No. 12/136,177, entitled "System and Method for Interrupting a Transmitting Device in a Communication System," filed Jun. 10, 2008, and assigned to the assignee of the present invention. In the method described therein, calls are transmitted from a device on a communication channel as a series of channel frames. At predetermined times during the transmission, the transmitting device drops a burst, resulting in open burst periods ("Open Burst Period" refers to the "hole" in a transmitted signal), where the transmitting device is not transmitting on the communication channel. An open burst period is often referred to as a Backward Channel as it allows information to flow from a radio receiving a call to a radio transmitting a call. During these open channel burst periods, the transmitting device switches to a receiving mode. Other devices in the system are then capable of ascertaining the timing of the open channel burst periods and switching into a transmitting mode during an open channel burst period. If another device in the system needs to interrupt the transmitting device, that other device sends an interrupt request on the communication channel to the transmitting device in order to request access to the channel. Upon receiving the interrupt request, the transmitting device ceases or pauses transmission, allowing the other device to then begin a new transmission on that same communication channel.

In a repeater system an interrupting subscriber unit/radio is required to know the backward channel location on the repeater's inbound channel, so the interrupt request does not collide with the existing transmission. The interrupting radio is monitoring the repeater's outbound channel, but the backward channel (a.k.a., dropped burst or open burst period) is on the repeater's inbound channel. Delay through the repeater offsets the backward channel location with respect to the outbound channel structure. It is important for the interrupting radio to know the backward channel location (the location of the open burst period) with respect to the outbound channel structure. When the repeater throughput delay is fixed and known a priori, the radio can use the fixed delay to determine the backward channel location with respect to the outbound channel structure; however, when the repeater's throughput delay is variable and not known a priori, the repeater's throughput delay must be dynamically determined and signaled via the repeater's outbound channel to the subscriber units so that the subscriber units are able to determine the location of the backward channel on the repeater's inbound channel.

In multi site communication networks, a repeater can support several repeat delays to accommodate different backend network latencies. These different delays change the backward channel location with respect to the outbound channel. Additionally, as the repeat delay increases the overall time it takes to shut down a transmission increases as well. These repeat delays may be fixed and preset through configuration or determined on a transmission by transmission basis.

For example, a multi site communication network may implement a small floor control window to select one of potentially many inbound transmissions from multiple sites to be sent out over the wide area network. This window adds delay to the system and moves the location of the inbound interrupt time slot with respect to the outbound location in the voice superframe. Since this window delays the backward channel relative to the outbound bursts, this window increases the time to interrupt.

The exact location of the backward channel is required at the site that contains the inbound transmission (because the repeater's inbound channel is in use), so the interrupt request does not collide with one of the voice bursts. It is not required at sites that do not contain the inbound voice transmission (because the repeater's inbound channel is not in-use), as the interrupt request can not collide with the inbound voice bursts. Therefore, allowing an interrupt message to be sent at any time, and not just the backward channel, at any site that does not contain the inbound transmission, can significantly decrease the interrupt time. This concept can be extended to a system that supports a device that is connected directly to the repeater, like a console. In the case when the console voice is being transmitted, there is no inbound transmission, and thus the interrupt request can be sent at any time.

Embodiments of the teachings herein are directed to a method provide a way to support different repeat delays and to decrease the overall average interrupt time on a channel.

Figure 2:
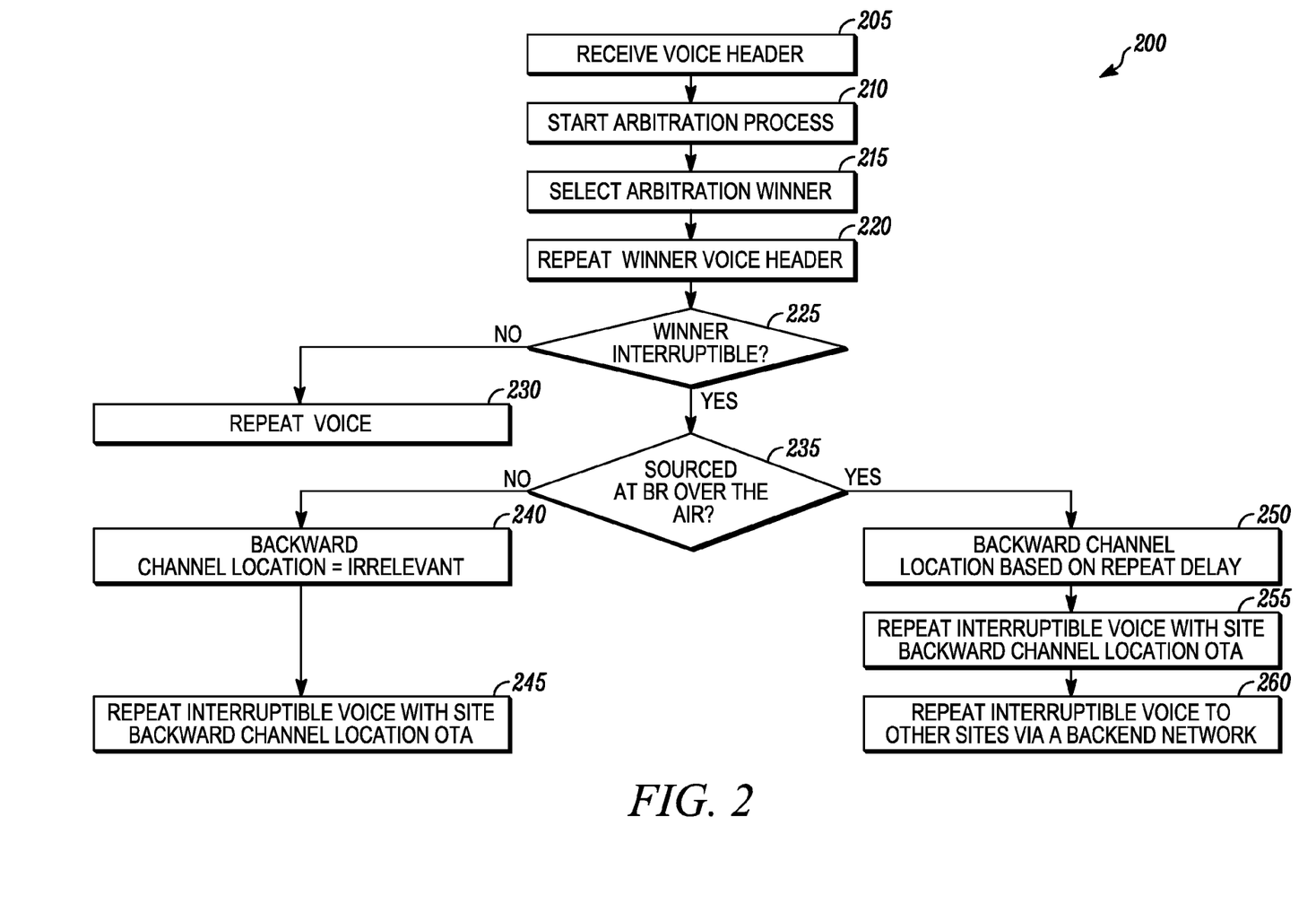
FIG. 2 is a flowchart illustrating a method in a wireless network for providing a message from an infrastructure to a group of wireless communication devices engaged in an interruptible wide area push-to-talk voice communication in accordance with some embodiments.

FIG. 2 is a flowchart illustrating a method 200 in a wireless network for providing a message from an infrastructure to a group of wireless communication devices engaged in an interruptible wide area push-to-talk voice communication in accordance with some embodiments. It will be appreciated by those of ordinary skill in the art that each base repeater (BR) in the wide area system operates using the process of FIG. 2. As illustrated, the operation begins with Step 205 with the reception of a voice header. It will be appreciated by those of ordinary skill in the art that the reception can be either Over The Air (OTA) or via the backend network. Next, in Step 210, for wide area solutions, an arbitration process takes place. In the event that more than one subscriber begins a transmission within a short time window of each other, the arbitration process accounts for static and dynamic delays though the backend network and enables each interconnected repeater to select the same subscriber's transmission for repeating in steps 220, 230, 245, 255, 260. At the completion of the process, in Step 215, a winner is selected; and in Step 220, the voice header is transmitted by the base repeater OTA. Next, in Step 225, the BR determines if the voice is interruptible. When it is not interruptible, the voice is repeated in Step 230. When the voice is interruptible, in Step 235, the source of the voice for that specific BR is determined. When the voice is not received from a source wirelessly (i.e. OTA) at the BR, the operation continues to Step 240 in which it then determines the Backward Channel location is irrelevant. Next, in Step 245, the BR repeats the interruptible voice along with the backward channel location. When, in Step 235, the voice is received from a source wirelessly (i.e. OTA) at the BR, the operation continues to Step 250, where the BR determines the Backward Channel location based on the repeat delay. Next, in Step 255, the BR repeats the interruptible voice along with the backward channel location. Next, in Step 260, the BR sends the voice to the other site BRs via a backend network (260).

When repeating voice, the repeater sends Link Control (LC) information embedded within the voice bursts. For example ETSI DMR TS 102 361 defines a six (6) burst voice superframe structure that embeds sync, four (4) concatenated embedded LC fields and a single embedded LC field in the voice bursts. The repeater is able to inform the radios of the backward channel location by periodically transmitting a single burst embedded Link Control (LC) Base Repeater (BR) Delay message. This message, for example, can be sent once every superframe or once every multiple of superframes, depending on such things as the call service being supported. As described in U.S. patent application Ser. No. 12/253,411, entitled "Method And Device For Sending Encryption Parameters," filed Oct. 17, 2008, and assigned to the assignee of the present invention, the frequency of sending this message can depend on whether the call is encrypted or unencrypted (clear) as the encryption call service uses the single burst embedded LC to convey encryption information as well.

Figures 3, 4:
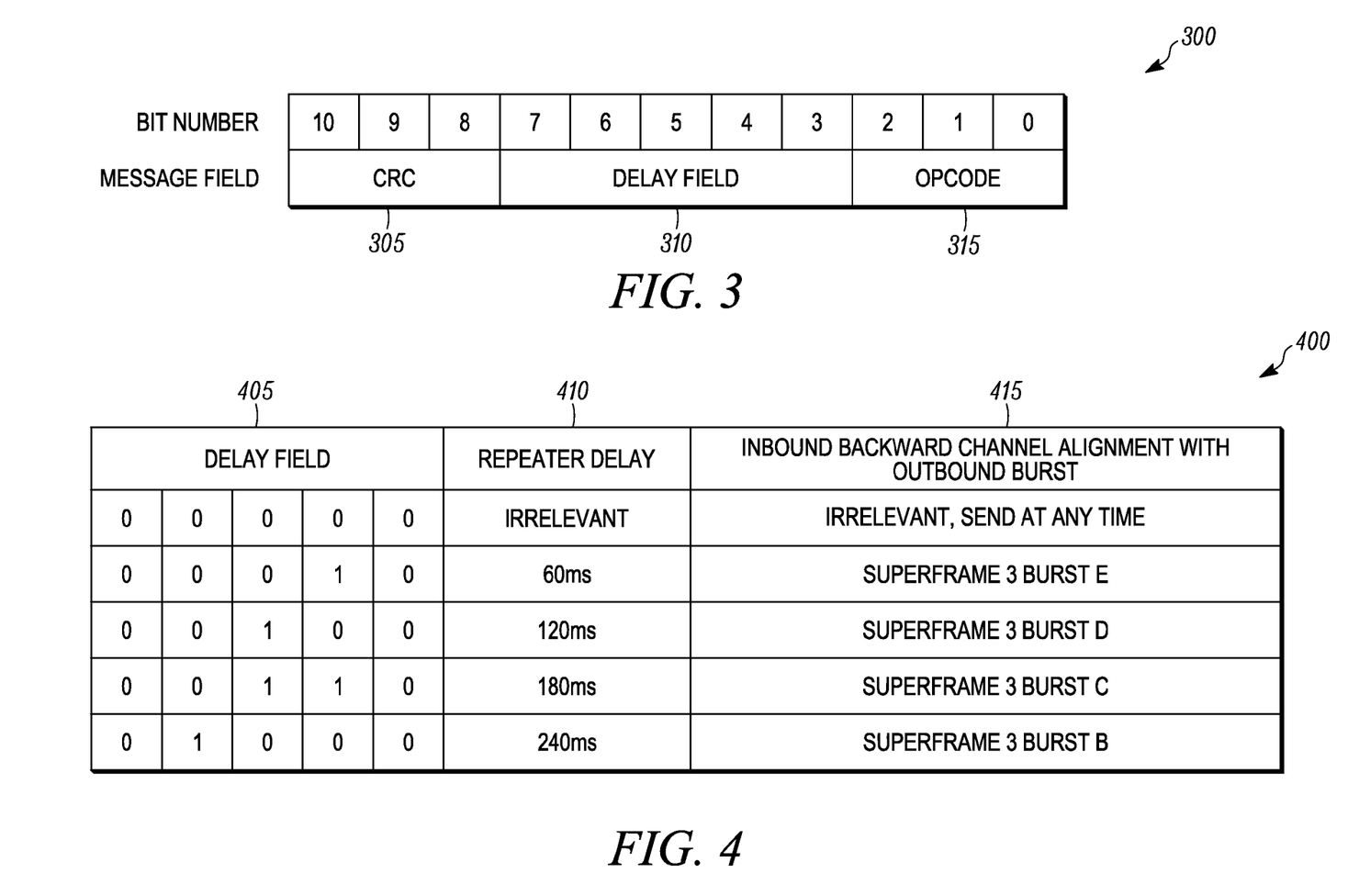
FIG. 3 illustrates a Single Burst Embedded Link Control (LC) in accordance with some embodiments.
FIG. 4 illustrates various delay field definitions in accordance with some embodiments.

FIG. 3 illustrates a Single Burst Embedded Link Control (LC) 300 in accordance with some embodiments. As illustrated the Single Burst Embedded LC message, used to convey the Backward Channel Location at the BR, adheres to the 11 bit structure of ETSI TS 102 361. The Single Burst Embedded Link Control (LC) 300, as illustrated, includes in its message field a cyclic redundancy check (CRC) field 305, a delay field 310 and an opcode field 315. The opcode field 315 generally indicates the type of information contained in the Single Burst Embedded LC 300 and how to decode and interpret the remainder of the information contained in the Single Burst Link Control. When the opcode field 315 indicates a BR Delay message, then the remainder of the message is interpreted as a delay field 310 and a CRC 305. The delay field 310 provides an indication of the delay or latency through the repeater and identifies the inbound backward channel alignment with the indicated outbound burst as described next in FIG. 4. The CRC field 305 provides an error detection check over the entire Single Burst Embedded Link Control 300. When the Single Burst Embedded Link Control is a BR Delay message, the CRC is computed over the opcode field 315, delay field 310, and the CRC field 305. It will be appreciated by those of ordinary skill in the art that the single burst LC doesn't always include a 3-bit CRC. For example, when used to transport encryption parameters, a 3-bit Key ID occupies those 3 bits. The CRC is present when Opcode=BR Delay ($011_2$) and Opcode=Null ($000_2$), but NOT when Opcode=ARC4 ($001_2$).

FIG. 4 illustrates various delay field definitions 400 in accordance with some embodiments. When the delay field in 405 is 00000, the inbound audio is not sourced over the air (OTA) at this BR and the BR delay is irrelevant. The interrupt request can be sent at any time in this situation. When the delay field 405 is other than 00000, it defines a 30 ms offset multiplier to indicate the location of the Backward Channel on the repeater's inbound channel with respect to voice superframe 3 burst F on the repeater's outbound channel. The location of the Backward channel on the repeater's inbound channel always precedes the location of voice superframe 3 burst F on the repeater's outbound channel. FIG. 4 shows the various repeat delays when the system operates in aligned repeater timing mode per ETSI TS 102 361. Here in these examples, all delays are multiples of 60 ms. The repeater delay 410 and the temporal relationship between the repeater's Inbound Backward Channel Alignment with Outbound Burst 415 vary according to the delay field definitions of FIG. 4. The Inbound Backward Channel Alignment with Outbound Burst 415 indicates what is present on the outbound channel when the backward channel is present on the inbound channel.

Figure 5:
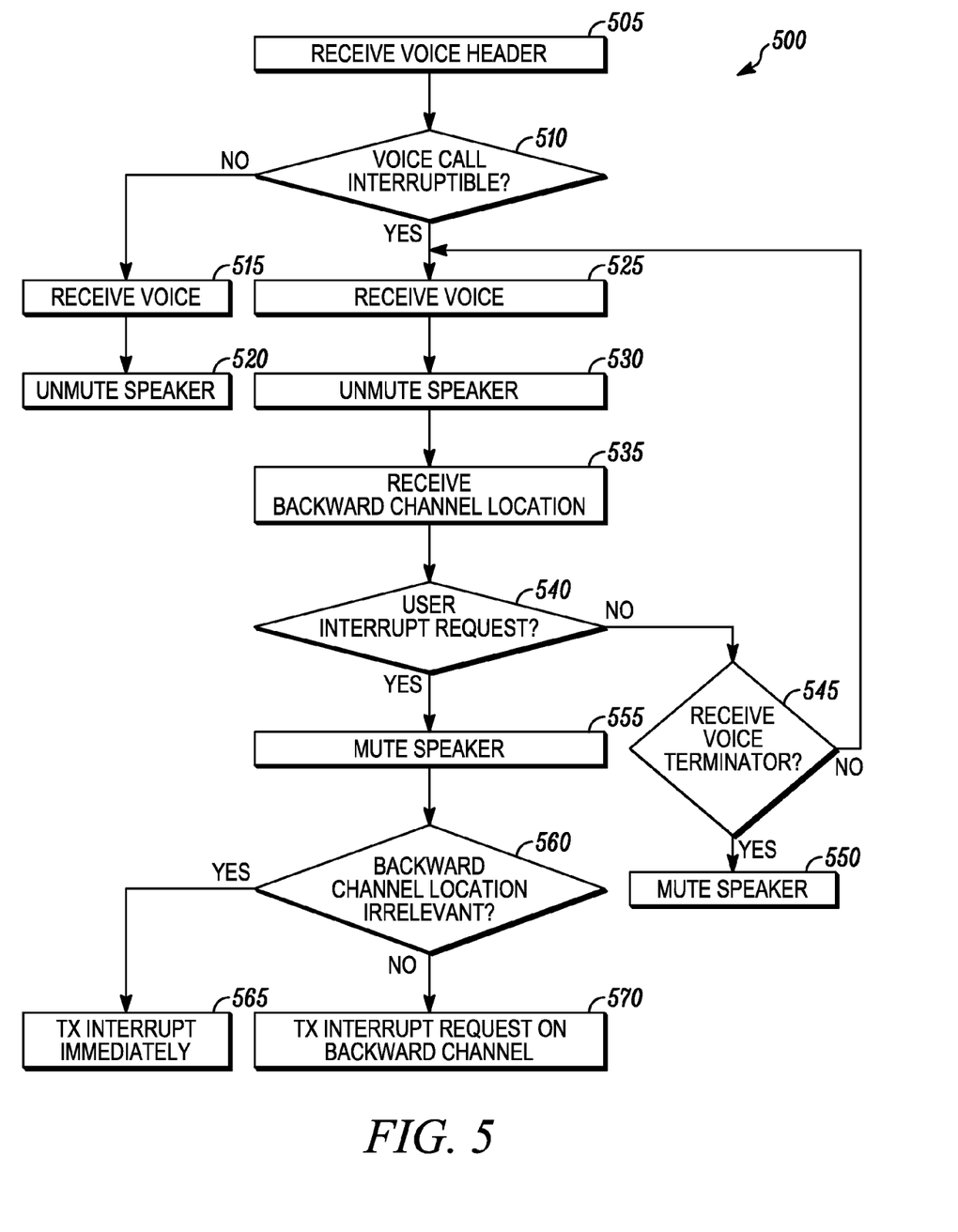
FIG. 5 is a flowchart illustrating a method of operation of a radio in a multi site communication system across different repeat delays in accordance with some embodiments.

FIG. 5 is a flowchart illustrating a method of operation 500 of a radio in a multi site communication system across different repeat delays in accordance with some embodiments. As illustrated in FIG. 5, the operation begins in Step 505 with a radio receiving a voice header to start a voice call. Next, in Step 510, the radio determines if the voice call is interruptible. When the call is not interruptible, the radio receives the voice call in Step 515. Next, in Step 520, the radio unmutes the speaker. When, in Step 510, the call is interruptible, the radio receives the voice call in Step 525, unmutes the speaker in Step 530, and receives the Backward Channel Location in Step 535 which may then be accessed by the radio for interrupt request transmissions.

While receiving voice, in Step 540 it is determined whether the radio's user has initiated an interrupt request. When no interrupt request has been initiated, the operation continues to Step 545 in which the radio determines whether or not a voice terminator has been received. When no voice terminator has been received, the operation cycles back to Step 525, and the radio continues to receive voice. When a voice terminator is received in Step 545, the operation continues to Step 550 and the speaker is muted.

When the radio's user initiates an interrupt request in Step 540, the speaker is muted in Step 555. Next, in Step 560, it is determined whether the Backward Channel Location is irrelevant, meaning the Over The Air (OTA) inbound transmission occurs at a different base repeater (BR). When the Backward Channel Location is irrelevant, the interrupt request is sent immediately in Step 565. When the Backward Channel location is not irrelevant, the interrupt request is sent on the specific Backward Channel Location in Step 570.

Figure 6:
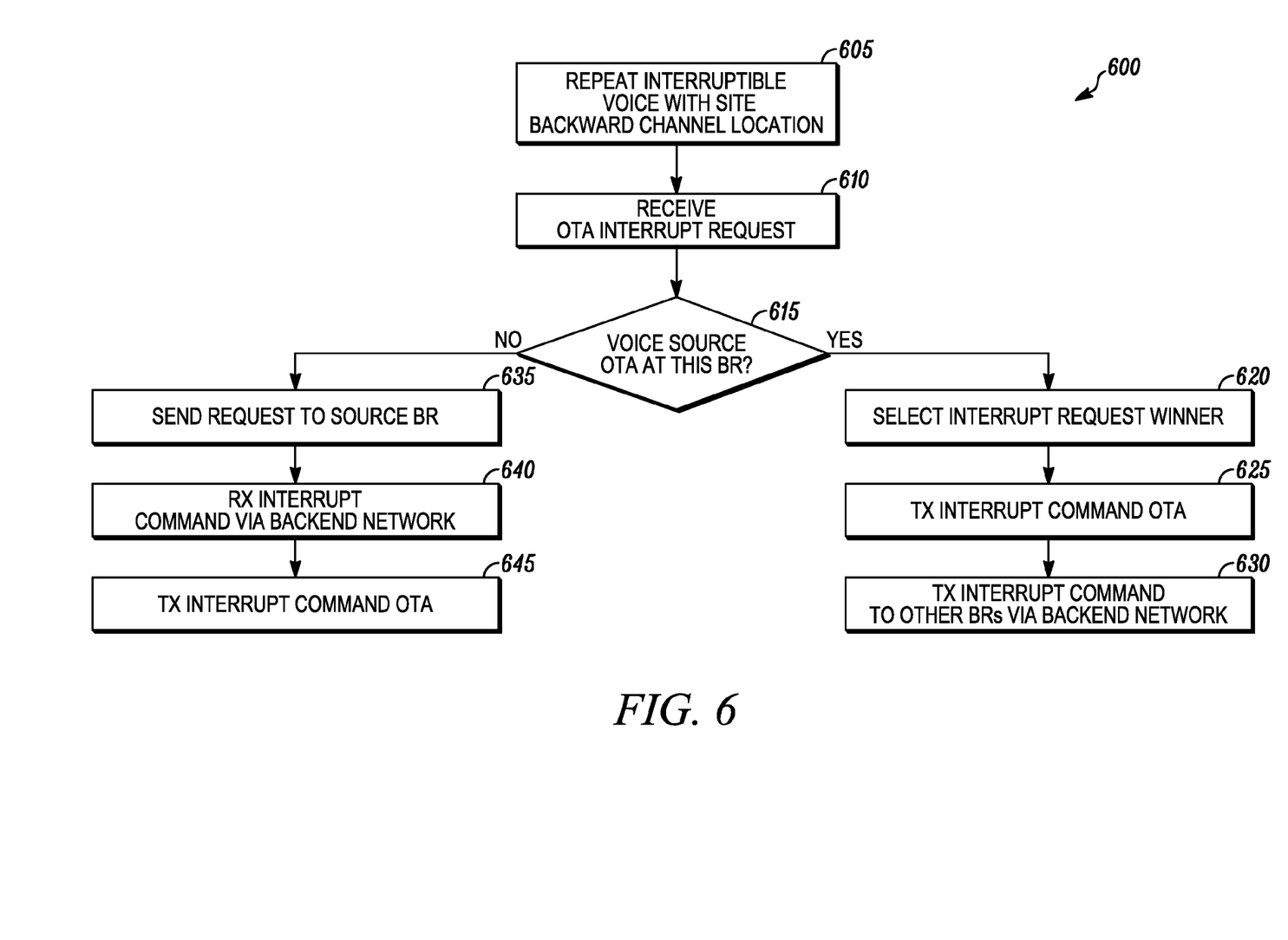
FIG. 6 is a flowchart illustrating a method of operation of a base repeater when repeating interruptible voice in a wide area network in accordance with some embodiments.

FIG. 6 is a flowchart illustrating a method of operation 600 of a base repeater (BR) when repeating interruptible voice in a wide area network in accordance with some embodiments. As illustrated, in Step 605, the BR repeats the received interruptible voice and embeds the appropriate Backward Channel Location information (also referred to as "Open Burst Location," this is a number that identifies the location of the open burst period) in a Single Burst Embedded Link Control Base Repeater Delay Message 605. Next, in Step 610, the BR receives an interrupt request. Next, in Step 615, the BR determines if it is the BR that is receiving the voice OTA. When it is the BR that is receiving the voice OTA, the operation continues to Step 620 and if multiple interrupt requests were received selects an interrupt request winner. It will be appreciated by those of ordinary skill in the art that for simplicity and brevity this is typically on a first come first serve basis. Next, in Step 625, the BR sends the winning received interrupt command OTA. Next, in Step 630, the BR sends the interrupt command to all the other BRs via the backend network. Returning to Step 615, when it is not the BR that is receiving the voice OTA, the operation continues to Step 635 in which the BR sends the received interrupt request to the BR receiving the voice OTA. Next, in Step 640, the BR receives the interrupt request winner from the BR receiving the voice OTA. Next, in Step 645, the BR sends the interrupt request of the winner OTA.

Figure 7:
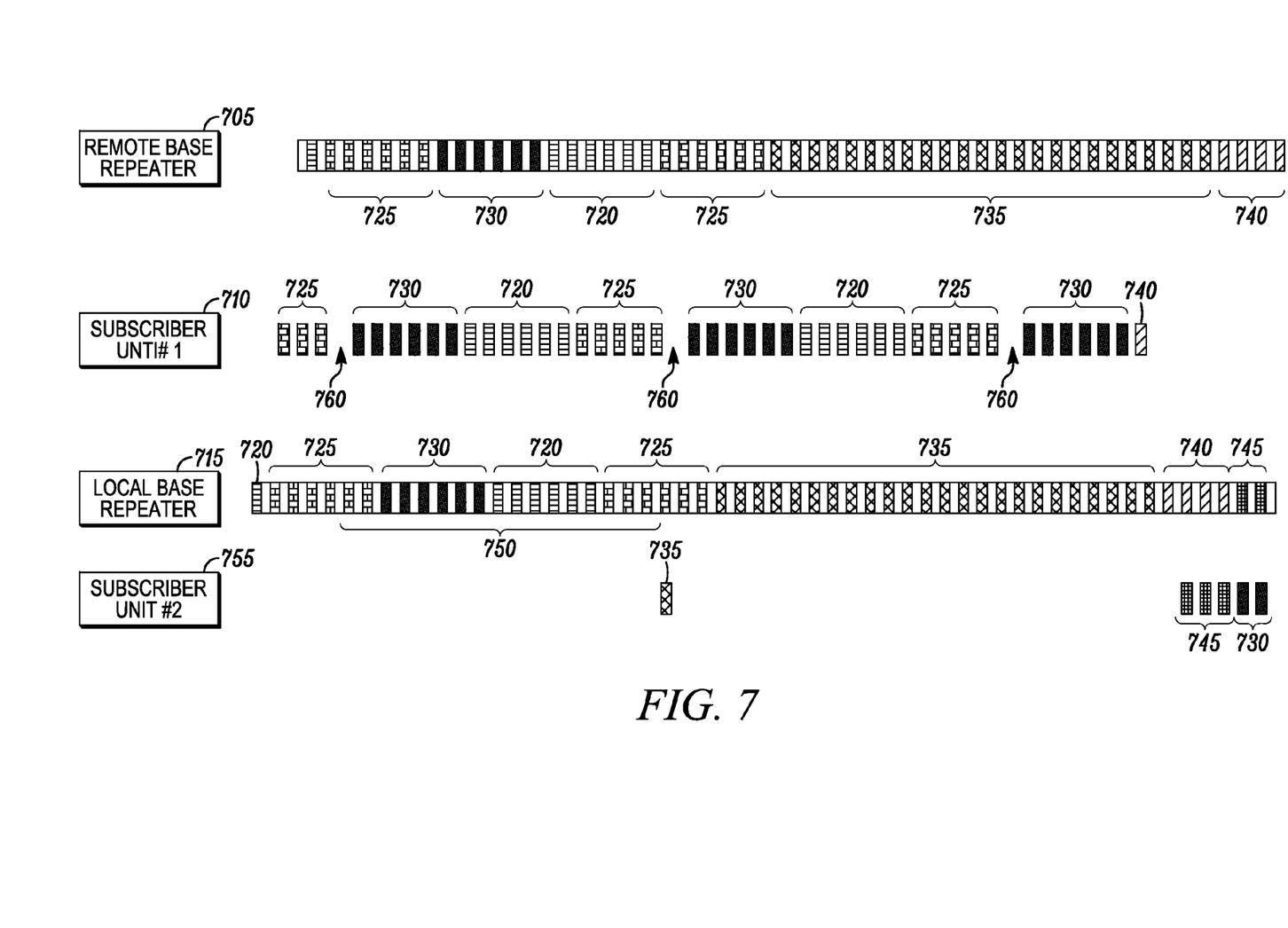
FIG. 7 is a signaling diagram illustrating the various transmissions between a remote base repeater, a subscriber unit #1, a local base repeater and a subscriber unit #2 in accordance with some embodiments.

FIG. 7 is a signaling diagram illustrating the various transmissions between a remote base repeater 705, a subscriber unit #1 710, a local base repeater 715 and a subscriber unit #2 755 in accordance with some embodiments. Local base repeater 715 is a Local Repeater with respect to the OTA inbound audio source. Remote base repeater 705 is remote to the Local base repeater and is not receiving the inbound audio OTA, but instead is receiving audio from the local BR via the backend network. Specifically, FIG. 7 illustrates an example interrupt request when a subscriber unit #1 710 is transmitting interruptible voice, local BR 715 is repeating the OTA voice and sending it to the remote base repeater 705 and subscriber unit #2 755 initiates an interrupt request OTA 735 to local base repeater 715. The various blocks shown in FIG. 7 indicate transmission of the various bursts and signals from the respective communication devices. It will be appreciated by those of ordinary skill in the art that the remote base repeater 705 has essentially a sixty (60) millisecond (ms) delta between local and remote repeater slots due to IP delay, however any time delta is applicable.

The signaling of FIG. 7 includes one embodiment of a multi-burst structure for a TDMA call signal that may be utilized to transmit call information on a TDMA carrier signal. In this embodiment, the TDMA call signal is separated into multiple superframes per ETSI TS 102 361 including a superframe 1 730, a superframe 2 720 and a superframe 3 725. Each superframe 730, 720, 725 includes six individual bursts A, B, C, D, E, and F, each of which is 27.5 ms in duration. Every 360 ms during a call, this superframe burst sequence is repeated. In this example burst F of superframe 3 760 is not transmitted on the repeater's inbound channel to create a backward channel location in order to allow for an interrupt request.

Each burst is received OTA by the local base repeater 715 and via the backend network by the remote base repeater 705 and retransmitted during a subsequent burst period to other communication devices on the outbound channel link. Thus, superframe 1 730 is transmitted from the subscriber unit #1 710, received by each of the repeaters 705 (indirectly via the backend network) and 715 (directly OTA), and retransmitted on the outbound channel link. The same process is then performed for each subsequent superframe. As illustrated, each of a superframe 1 730, a superframe 2 720 and a superframe 3 725 is transmitted and processed by each of the remote base repeater 705, the subscriber unit #2 755, and the local base repeater 715.

As illustrated, a receiving subscriber (755) can request an interrupt by transmitting a Backward Channel Request Control Signaling Block (CSBK) message 735 on the repeaters inbound channel link during dropped burst 760. There are various scenarios where it may be desirable to interrupt the transmitting device. For example, it may be desirable to interrupt a transmitting device if another device needs to transmit an emergency call. It may also be desirable to interrupt a transmitting device if a higher-priority device needs to initiate a call. It may also be desirable to interrupt a transmitting device if a non-transmitting device needs to send an urgent data message or an event indicator to the transmitting device. If devices in the communication system are configured to permit remote monitoring (i.e., allowing one device to remotely activate the microphone of another device), it may also be desirable to also remotely interrupt or dekey the device being monitored.

It will be appreciated that these are provided merely as examples, and it should be understood that there may be numerous other scenarios where it would be desirable to interrupt the transmitting device. As an example, the base repeater may be configured to transmit an interrupt request to a transmitting device upon receiving a command from a console site or other device to interrupt the transmitting device. It should also be understood that the interrupt request may be configured to cause the transmitting device to either completely cease transmitting or to pause for a certain amount of time.

As illustrated in FIG. 7, the local base repeater (715), after receiving the interrupt request 735 from subscriber unit #2 755, transmits the request to the receiving and interrupting devices on the outbound channel link and to the remote base repeaters via the backend network. A request window 750 within the local base repeater 715 allows for receipt of multiple interrupt requests from other remote sites. The local base repeater 715, as described previously herein, processes the requests on a first come, first served basis. The transmitting subscriber unit #1 710 receives the interrupt request 735 at 760, completes transmission of superframe 1 730 and transmits an acknowledgement 740, to interrupting subscriber #2 755, that it has ended its transmission. The local base repeater 715 then repeats the acknowledgement 740. Upon reception of acknowledgement 740, subscriber #2 755 is now able to start a new voice transmission with a voice header 745 and superframe 1 730.

Figure 8:
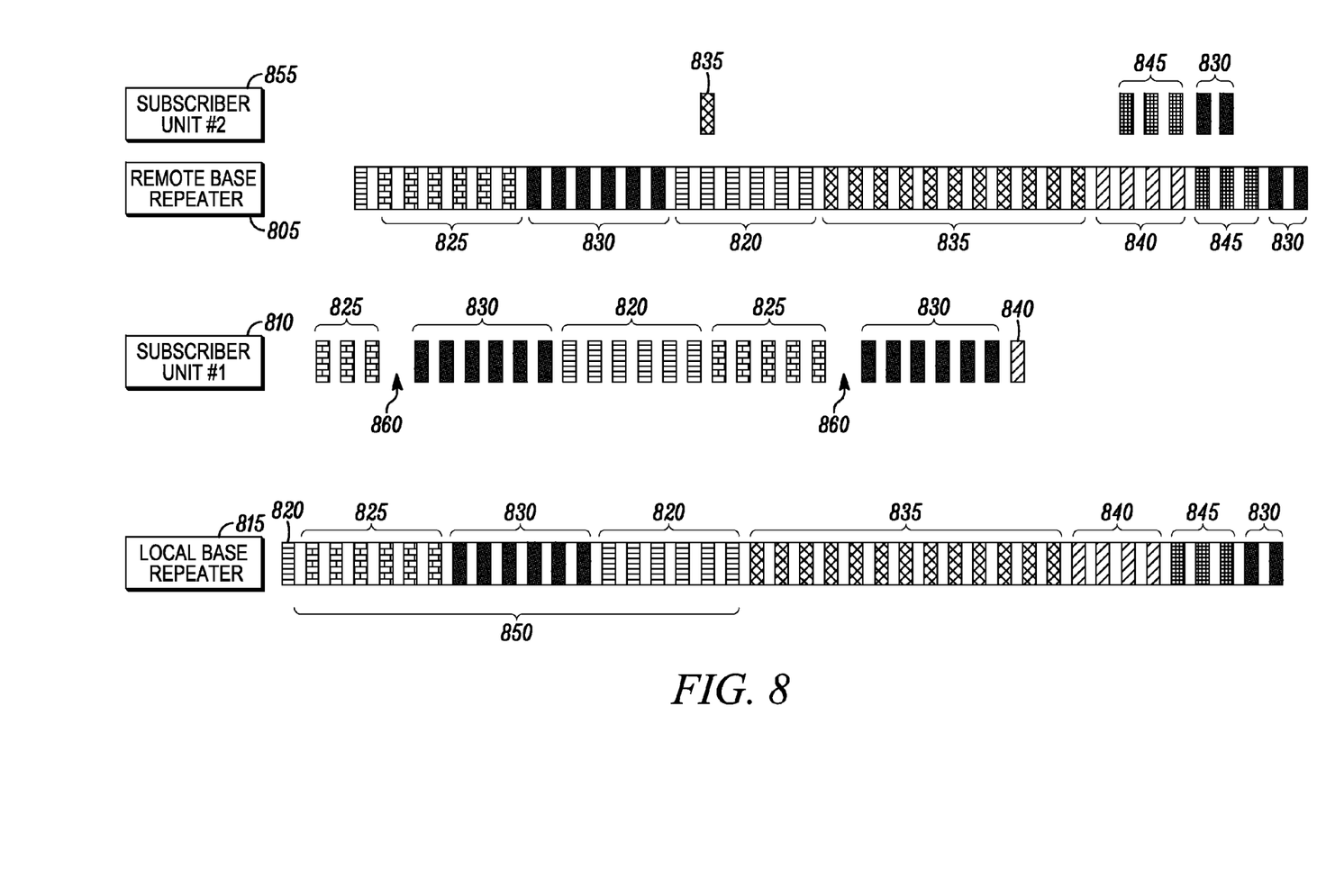
FIG. 8 is a signaling diagram illustrating a communication of an interrupt request when an interrupting subscriber unit #2 interrupts at a remote base repeater, while a subscriber unit #1 is transmitting interruptible voice to local base repeater in accordance with some embodiments.

FIG. 8 is a signaling diagram illustrating a communication of an interrupt request when an interrupting subscriber unit #2 855 interrupts at a remote base repeater 805, while a subscriber unit #1 810 is transmitting interruptible voice to local base repeater 815 in accordance with some embodiments. As described in FIG. 7, the interruptible voice transmission consists of superframe 1 830, superframe 2 820, superframe 3 825 and the dropped inbound burst 860.

As illustrated in FIG. 8, the remote base repeater 805, after receiving the interrupt request 835 from subscriber unit #2 855, transmits the request to the local base repeater 815 via the backend network. It should be noted that as opposed to FIG. 7, this scenario does not require the interrupt request 835 to be sent during the dropped burst 860, because the remote base repeater's inbound channel is idle. A request window 850 comprising superframes 825, 830, 820 within the local base repeater 815 allows for receipt of multiple interrupt requests from other remote sites. The local repeater 815, as described previously herein, processes the requests on a first come, first served basis. Upon selection of the interrupt request the local base repeater 815 transmits the interrupt request 835 OTA and to the remote base repeater 805 via the backend network. The transmitting subscriber unit #1 810 receives the interrupt request 835 during 860, completes transmission of superframe 1 830 and transmits an acknowledgement 840, to interrupting subscriber #2 855, that it has ended its transmission. Upon reception of acknowledgement 840, subscriber #2 855 is now able to start a new voice transmission with a voice header 845 followed by superframe 1 830.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for interrupting voice transmissions within a multi site communication system comprising:
   operating a repeater to:
      engage in an interruptible voice communication;
      identify an open burst location based on a repeat delay when the interruptible voice communication is received from a source directly via a wireless network, and identify the open burst location as irrelevant when the interruptible voice communication is received from a source indirectly via a backend network; and
      repeat the interruptible voice communication including the open burst location.

2. The method as recited in claim 1, wherein the open burst location is embedded within a repeater delay message.

3. The method as recited in claim 1, wherein when the voice communication is received via the wireless network, the repeat step comprises:
   operating the repeater to:
      repeat the interruptible voice communication with the open burst location wirelessly; and
      transmit the interruptible voice communication via a backend network to one or more other repeaters.

4. The method as recited in claim 1, wherein when the voice communication is not sourced via the wireless network, the repeat step comprises:
   operating the repeater to:
      repeat the interruptible voice communication wirelessly.

5. The method as recited in claim 1, further comprising:
   operating the repeater to:
      receive an interrupt request; and
      when a voice source of the interruptible voice communication is at the repeater:
         transmit an interrupt command wirelessly, and
         transmit the interrupt command via a backend network to one or more other repeaters.

6. The method as recited in claim 1, further comprising:
   operating the repeater to:
      receive an interrupt request; and
      when a voice source of the interruptible voice communication is not at the repeater:
         transmit the interrupt request to a repeater with the voice source,
         receive an interrupt command from the repeater with the voice source, and
         transmit the interrupt command wirelessly.

7. The method as recited in claim 6, wherein the interrupt command comprises an interrupt command of an interrupt request winner selected at the repeater with the voice source from a plurality of received interrupt requests.

8. The method as recited in claim 1, further comprising:
operating the repeater to:
  receive a plurality of interrupt requests;
  select an interrupt request winner; and
  when a voice source of the interruptible voice communication is at the repeater:
    transmit an interrupt command of the interrupt request winner wirelessly, and
    transmit the interrupt command of the interrupt request winner via a backend network to one or more other repeaters.

9. The method as recited in claim 1, further comprising:
operating a radio to:
  receive the interruptible voice communication including the open burst location;
  receive a user initiated interrupt request; and
  transmit the interrupt request on a backward channel at the open burst location.

10. The method as recited in claim 1, wherein when the open burst location is irrelevant, operating the radio to:
  transmit the interrupt request immediately.

* * * * *